(12) United States Patent
Tominaga et al.

(10) Patent No.: US 9,986,106 B2
(45) Date of Patent: May 29, 2018

(54) COLOR PATCH GENERATION APPARATUS AND IMAGE FORMING APPARATUS, AND NON-TRANSITORY COMPUTER READABLE MEDIUM

(71) Applicant: FUJI XEROX CO., LTD., Tokyo (JP)

(72) Inventors: Kaori Tominaga, Yokohama (JP); Shinsuke Sugi, Yokohama (JP); Yousuke Tashiro, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 72 days.

(21) Appl. No.: 15/006,702

(22) Filed: Jan. 26, 2016

(65) Prior Publication Data
US 2017/0085726 A1  Mar. 23, 2017

(30) Foreign Application Priority Data

Sep. 17, 2015 (JP) .................................. 2015-183848
Sep. 17, 2015 (JP) .................................. 2015-183882

(51) Int. Cl.
*H04N 1/60* (2006.01)
*G03F 3/08* (2006.01)
*H04N 1/00* (2006.01)
*G01J 3/50* (2006.01)

(52) U.S. Cl.
CPC ............ *H04N 1/00045* (2013.01); *G01J 3/50* (2013.01); *H04N 1/00023* (2013.01); *H04N 1/00087* (2013.01); *H04N 1/00411* (2013.01); *H04N 1/6008* (2013.01); *H04N 1/6033* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,416,613 A * | 5/1995 | Rolleston | ........... | H04N 1/00002 356/243.5 |
| 6,008,907 A * | 12/1999 | Vigneau | ............... | H04N 1/6033 348/179 |
| 6,480,299 B1 * | 11/2002 | Drakopoulos | ....... | H04N 1/6033 358/1.1 |
| 7,307,755 B2 * | 12/2007 | Delang | ............... | B41F 33/0036 358/1.9 |
| 7,339,696 B2 * | 3/2008 | Ferlitsch | ............... | G06F 3/1204 358/1.15 |
| 8,531,731 B2 * | 9/2013 | Wu | ...................... | H04N 1/6033 358/1.9 |
| 8,797,589 B2 * | 8/2014 | Dalal | ................... | H04N 1/6033 358/1.18 |

(Continued)

FOREIGN PATENT DOCUMENTS

JP   2011-116898 A   6/2011
JP   2012-248934 A   12/2012

*Primary Examiner* — Madelein Nguyen
(74) *Attorney, Agent, or Firm* — Oliff PLC (57) ABSTRACT

A color patch generation apparatus includes a printing unit that prints color patches for first color space acquisition in a certain region of a plurality of sheets of paper by a certain number of patches and in a certain patch size, and prints color patches for second color space acquisition in a region different from the certain region of at least one of the plurality of sheets of paper by a certain number of patches and in a patch size smaller than the certain patch size.

13 Claims, 9 Drawing Sheets

(56) References Cited

U.S. PATENT DOCUMENTS

| | | | | |
|---|---|---|---|---|
| 8,976,413 B2* | 3/2015 | Iwafuchi | ............... | B41J 2/2128 358/1.9 |
| 2002/0051002 A1* | 5/2002 | Kumada | .............. | H04N 1/6033 345/600 |
| 2007/0002344 A1* | 1/2007 | Klassen | ............. | H04N 1/00002 358/1.9 |
| 2007/0008558 A1* | 1/2007 | Rumph | .................... | H04N 1/60 358/1.9 |
| 2007/0030505 A1* | 2/2007 | Ito | ........................ | H04N 1/6033 358/1.9 |
| 2007/0176942 A1* | 8/2007 | Itagaki | ............... | H04N 1/00023 345/589 |
| 2008/0240829 A1* | 10/2008 | Miyazaki | ........... | H04N 1/00002 400/76 |
| 2008/0273794 A1* | 11/2008 | Samworth | ............ | H04N 1/6022 382/167 |
| 2010/0265524 A1* | 10/2010 | Muramatsu | ........ | H04N 1/32106 358/1.9 |
| 2012/0206744 A1* | 8/2012 | Kobayashi | ........... | H04N 1/6038 358/1.9 |
| 2013/0229671 A1* | 9/2013 | Yokozawa | ........... | H04N 1/6033 358/1.9 |
| 2013/0258368 A1* | 10/2013 | Shigemoto | ......... | H04N 1/00082 358/1.9 |
| 2013/0322701 A1* | 12/2013 | Szymanski | ........ | H04N 1/00015 382/112 |
| 2014/0233049 A1* | 8/2014 | Takemura | ............ | H04N 1/0005 358/1.12 |
| 2015/0116740 A1* | 4/2015 | Miyanaga | ............ | H04N 1/6008 358/1.9 |
| 2015/0158309 A1* | 6/2015 | Fujii | ..................... | G01N 21/251 347/19 |
| 2015/0350484 A1* | 12/2015 | Suzuki | ................. | H04N 1/2338 358/474 |
| 2015/0365564 A1* | 12/2015 | Imaseki | ............... | H04N 1/6019 358/504 |
| 2016/0248942 A1* | 8/2016 | Horita | ................... | H04N 1/6019 |
| 2016/0301830 A1* | 10/2016 | Shibata | ................. | H04N 1/6036 |
| 2017/0039458 A1* | 2/2017 | Kuwada | ............. | G06K 15/1802 |

* cited by examiner

FIG. 7A
LONGITUDINAL
$\Delta$RGB LONGITUDINAL

FIRST SHEET — 18-TH SHEET
NUMBER OF SHEETS OF CHART

FIG. 7B
LATERAL
$\Delta$RGB LATERAL

FIRST SHEET — 18-TH SHEET
NUMBER OF SHEETS OF CHART

FIG. 7C
OBLIQUE

FIRST SHEET — 18-TH SHEET
NUMBER OF SHEETS OF CHART

| ⊿RGB | SECOND SHEET | ... | 17-TH SHEET | 18-TH SHEET |
|---|---|---|---|---|
| FIRST SHEET | ⊿RGB 1-2 | ... | ⊿RGB 1-17 | ⊿RGB 1-18 |
| SECOND SHEET | | ... | ⊿RGB 2-17 | ⊿RGB 2-18 |
| ... | | | ... | ... |
| 17-TH SHEET | | | | ⊿RGB 17-18 |

COLOR PATCH GENERATION APPARATUS AND IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-183848 filed on Sep. 17, 2015 and Japanese Patent Application No. 2015-183882 filed Sep. 17, 2015.

BACKGROUND

1. Technical Field

The present invention relates to a color patch generation apparatus, an image forming apparatus, and a non-transitory computer readable medium.

2. Related Art

In an image forming apparatus such as a printer, it is conceivable to acquire a Lab value by reading a printing result of the image forming apparatus by a colorimeter, in order to periodically check whether it is in a normal state where color shift does not occur; but since color measurement is a manual job, it is troublesome. Therefore, it has been proposed to acquire an RGB value by automatically reading the printing result by using an in-line sensor or the like of the image forming apparatus, without using the colorimeter, and to convert the RGB value into a Lab value.

SUMMARY

An aspect of the present invention provides a color patch generation apparatus including: a printing unit that prints color patches for first color space acquisition in a certain region of a plurality of sheets of paper by a certain number of patches and in a certain patch size, and prints color patches for second color space acquisition in a region different from the certain region of at least one of the plurality of sheets of paper by a certain number of patches and in a patch size smaller than the certain patch size.

BRIEF DESCRIPTION OF DRAWINGS

Exemplary embodiment(s) of the present invention will be described in detail based on the following figures, wherein.

DETAILED DESCRIPTION

Exemplary Embodiment 1

Hereinafter, Exemplary embodiment 1 will be described with reference to the drawings.

Basic Principle

The basic principle of the present embodiment is a technique of separately arranging a color patch for first color space value acquisition and a color patch for second color space value acquisition, and setting the patch size of the color patch for second color space value acquisition to be smaller such that the color patch for second color space value acquisition is also arranged on paper, that is, a chart having the color patch for first color space value acquisition printed thereon. Here, the first color space is a color space that depends on an image forming apparatus (apparatus-dependent color space), and for example, RGB corresponds thereto. Further, the second color space is a color space that does not depend on the image forming apparatus (apparatus-independent color space), and for example, Lab corresponds thereto. Hereinafter, a description will be made, with the first color space as RGB, and the second color space as Lab.

A color patch for RGB value acquisition is required to be printed on paper, in a certain region thereof, in a predetermined patch size, due to implementation and technical constraints of reading unit, provided inside the image forming apparatus such as an in-line sensor, for acquiring color of the apparatus-dependent color space, and thus color patches are printed on a plurality of sheets of paper. If a plurality of sheets of color patches for RGB value acquisition are color-measured as they are by using a colorimeter, the color measurement for a plurality of sheets of color patches would be troublesome.

Therefore, the present embodiment is intended to allow a significant reduction in the color measurement steps without increasing the total number of sheets of paper (chart), even if the color patch for RGB value acquisition and the color patch for Lab value acquisition are separate things, by reducing the number of sheets of the color patch for Lab value acquisition by setting patch size of the color patch for Lab value acquisition to be relatively small, and by arranging the number of color patches for Lab value acquisition on the same paper as the color patch for RGB value acquisition, by utilizing the fact that the influence of the cavity effect is relatively small at the time of the RGB value acquisition by the in-line sensor, in the color measurement using the colorimeter.

In the present embodiment, if the number of sheets of color patches for RGB value acquisition is M, the number of patches is m, the number of sheets of charts of the color patch for Lab value acquisition is N, and the number of patches is n, it is established that M>N and m=n. However, M>N may not be established, and rather M≥N may be established. What includes M=N means considering that the arrangement of the color patch for Lab value acquisition may have redundancy.

The following description exemplifies the case where M=18, N=2, and m=n=1584, but it is needless to say that the present embodiment is not limited thereto.

Further, in the present embodiment, the color patch for RGB value acquisition and the color patch for Lab value acquisition are arranged in different positions on the same paper (the same chart), but all sheets of paper do not need to include the color patch for RGB value acquisition and the color patch for Lab value acquisition. In other words, the color patch for Lab value acquisition may be included in at least any one of the plurality of sheets of paper (chart) on which the color patch for RGB value acquisition is arranged.

Further, the color patch for RGB value acquisition and the color patch for Lab value acquisition are arranged separately in the upper and lower parts of the same paper (chart) in the present embodiment, but may separately be arranged on the left and right parts as necessary, and the position may arbitrarily be set.

Configuration

Hereinafter, the configuration of the present embodiment will be described in detail.

Figure 1:
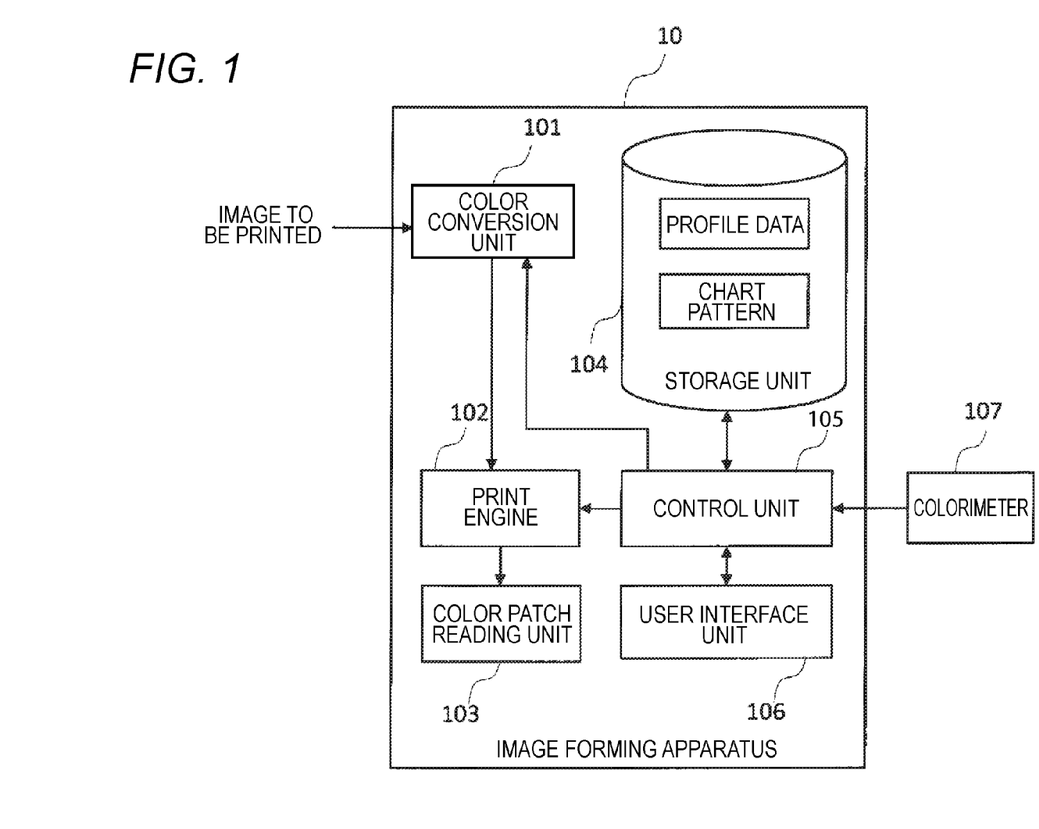
FIG. 1 is a configuration diagram of an image forming apparatus according to an embodiment.

FIG. 1 is a configuration diagram illustrating an image forming apparatus according to the present embodiment. Further, an image forming apparatus 10 may be connected to a management server over a network.

The image forming apparatus 10 is a printer, a multi-function machine, or the like, and includes a color conversion unit 101, a print engine 102, a color patch reading unit 103, a storage unit 104, a control unit 105, and a user interface unit 106. A colorimeter 107 may be a part of the image forming apparatus 10, or may separately be present.

The image forming apparatus 10 performs a processing for printing out an input print image data. The print image data is, for example, bitmap image data, or image data written in page description language (PDL). When the image forming apparatus 10 includes a scanner, the image data that the scanner read may be used as print image data. The print image data is converted into a raster image that the print engine 102 can process, by an interpreter (not illustrated) or other image processing unit.

The color conversion unit 101 performs color conversion according to profile data, on the raster image. The profile data is data containing information indicating a correspondence relationship between the color coordinate of each lattice point of an input-side color space and the color coordinate of an output-side color space corresponding to the lattice point. The output-side color space is a color space of the print engine 102, and is typically represented by the combination of four colors of cyan (C), magenta (M), yellow (Y), and block (K). The profile data is generated by the control unit 105, and is stored in the storage unit 104. For example, the profile data is generated for each type of paper, and stored in the storage unit 104, and the user may select and use data suitable for the paper to be used, from a plurality of pieces of profile data. With respect to each pixel of a raster image, the color conversion unit 101 calculates the color coordinate of an output-side color space when the value (color coordinate) of the pixel is set as the color coordinate of an input-side color space, according to the profile data.

The print engine 102 prints an image resulted from the color conversion that is output by the color conversion unit 101, on the paper.

The color patch reading unit 103 obtains RGB values by reading the color patch that the print engine 102 has printed based on the control of the control unit 105, and outputs the obtained RGB values to the control unit 105. The color patch reading unit 103 is formed of an in-line sensor (IS) and the like. The in-line sensor has substantially the same configuration as a known image reading scanner, and specifically includes an imaging unit, an illumination unit, an image processing unit and a sensor calibration unit. It is preferable that the mounting position of the color patch reading unit 103 in the image forming apparatus 10 is the vicinity of a sheet discharge unit in which the state of the paper is stable by the coloring of the printed color patch being completed and curling of paper being removed. The image processing unit includes a three-color COD, and calculates color information of a color patch by performing read variation correction in real time.

The control unit 105 controls the entire image forming apparatus 10 in accordance with a processing program stored in the program memory. The control unit 105 receives a print instruction from the user through the user interface unit 106, and executes printing of a target image of the print instruction by controlling the color conversion unit 101, the print engine 102, or the like. Further, the control unit 105 executes processing for generating the profile data. The print engine 102 prints a color patch that is a reference of color, the color patch reading unit 103 reads the printed result, and the colorimeter 107 measures the color of the printed result, such that the profile data is generated based on a data group of an RGB value and a Lab value which are obtained from these measured results. The generated profile data is stored in the storage unit 104. The color patch is an image pattern in which color patches are arranged for respective color patches having a plurality of different stages of densities, for each of CMYK colors. The color patch data is stored in the storage unit 104 as a chart pattern, and the control unit 105 reads the data and causes the print engine 102 to print the read data, in accordance with the processing program.

A known algorithm can be used for a method of calculating the profile indicating the conversion from RGB value to the Lab value. The method may be configured of, for example, a first step of performing brightness conversion based on a look-up table (LUT), and a second step of performing linear conversion using a matrix calculation (for example, a matrix calculation of 3×10), and the coefficients of a matrix equation is calculated by a constant calculation algorithm from a number of color patch reading values. These LUT and the coefficients of a matrix equation are stored in the storage unit 104 as parameters.

The user interface unit 106 notifies the user of the state of the image forming apparatus 10, and receives an instruction input from the user. The user interface unit 106 may be provided with, for example, a display such as a liquid crystal touch panel, and input buttons such as a keypad.

Here, although the chart pattern stored in the storage unit 104 is data that defines an array of color patches printed by the print engine 102 in order to acquire the RGB value and Lab value, it is possible to arrange the color patches only on half of the printing paper due to implementation and technical constraints of the color patch reading unit 103, and the light emitted from the light source is reflected from the color patch to be measured as well as from adjacent color patches, and the light returned to the light source from the adjacent color patch is further reflected and applied to the color patch to be measured, such that if considering a cavity effect in which the reflected light affected by the reflectivity of the adjacent color patch is received by an image reading device, there is also a need to ensure the patch area, such that a plurality of sheets, for example, 18 sheets of color patches are used. In this case, it is required for acquisition of RGB values that reading is performed at the time of the output of 18 sheets of color patches and these 18 sheets of color patches are color-measured by the colorimeter 107, such that it takes time for color measurement process.

Therefore, the control unit 105 sets color patches of the same combination (however, the size is smaller) as in the color patches for RGB value acquisition, for acquisition of Lab values, separately from the color patch for RGB value acquisition, in accordance with the processing program, and arranges the color patch for Lab value acquisition on the same paper as in the color patch for RGB value acquisition.

Next, a color patch of the present embodiment will be described.

Figure 2:
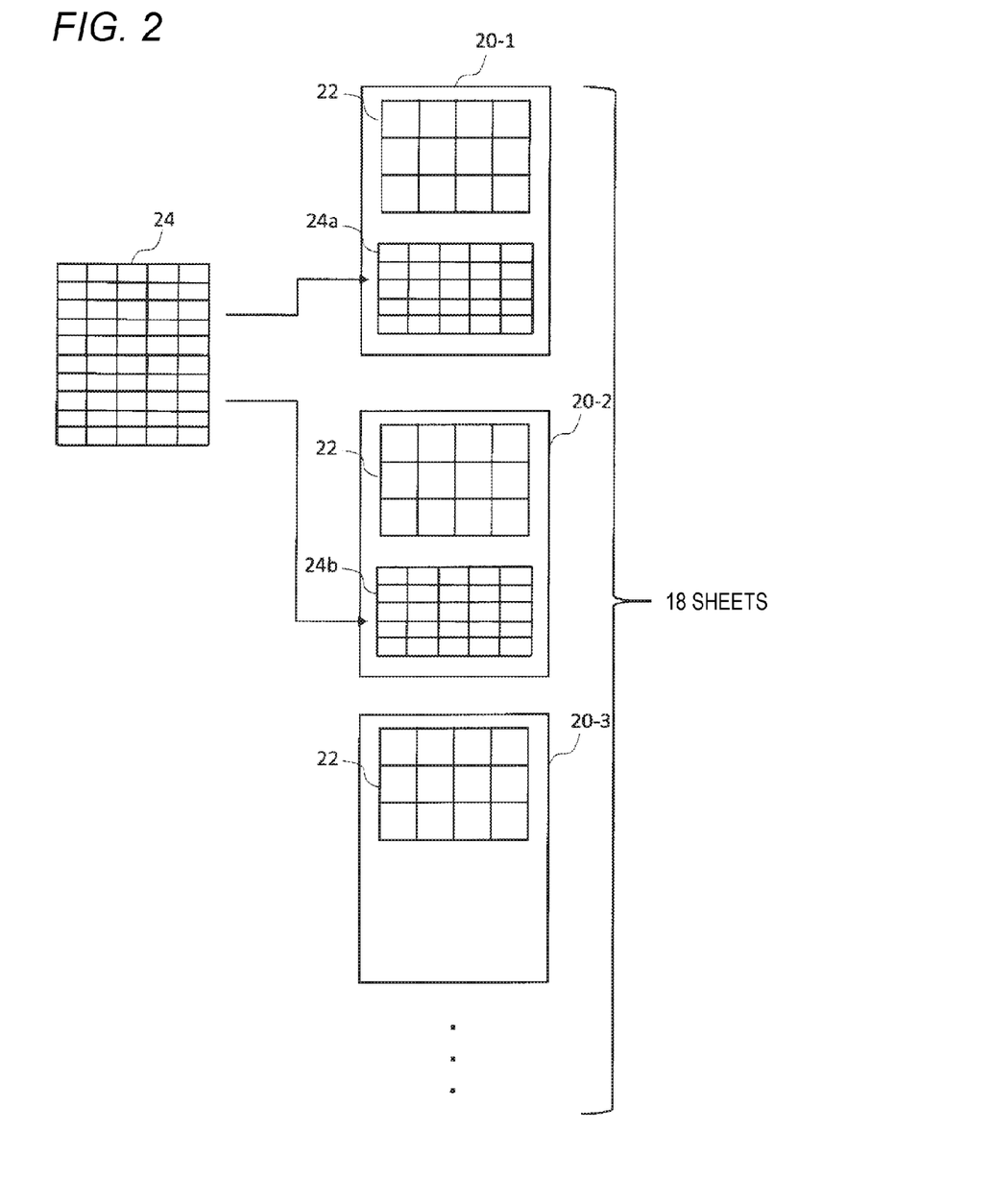
FIG. 2 is an explanatory diagram of a color patch according to the embodiment.

FIG. 2 schematically illustrates the color patch for RGB value acquisition and the color patch for Lab value acquisition according to the present embodiment. The color patches are denoted by hollow rectangular regions in FIG. 2, but actually are patches having densities varying in a plurality of stages, for each of CMYK colors. Color patch for RGB value acquisition As described above, the color patch for RGB value acquisition has an implement constraint of the color patch reading unit (in-line sensor) 103 and a technical constraint such as a cavity effect, and color patches are printed on a plurality of sheets of paper. Specifically, if it is possible to arrange the patch only on the half of one sheet of paper, the area of one color patch is 2 cm×2 cm or more, and the number of patches is 1584, the number of sheets of the color patches is 18. These sheets of paper (charts) having 18 sheets of color patches for RGB value acquisition printed thereon are 20-1, 20-2, 20-3, . . . , 20-18 (only 20-1, 20-2, and 20-3 are illustrated in FIG. 2). The color patches 22 for RGB value acquisition are printed on the upper half of each of the 18 sheets of paper 20-1, 20-2, 20-3, 20-18. Of course, the pattern of the color patch 22 printed on the paper 20-1, and the pattern of the color patch 22 printed on the sheets of paper 20-2 or 20-3 are different from each other.

Color Patch for Lab Value Acquisition

Meanwhile, since the color patch for Lab value acquisition is not affected from the cavity effect as the color patch reading unit (in-line sensor) 103, it is possible to set the area of a single color patch to be smaller than the color patch 22 for RGB value acquisition, and the area can be reduced to, for example, about 0.7 cm×0.7 cm.

Thus, while having the same number (1584) of patches as that of the color patch 22 for RGB value acquisition, by taking advantage of the fact the area of one of the patch is small, the color patch 24 for Lab value acquisition is divided into two color patches 24a and 24b for Lab value acquisition, the color patch 24a for Lab value acquisition is printed on the lower half of the paper 20-1 having the color patch 22 printed on the upper half thereof, and the color patch 24b for Lab value acquisition is printed on the lower half of the paper 20-2 having the color patch 22 printed on the upper half thereof.

There is no need to print the color patch 24 for Lab value acquisition on other sheets of paper 20-3, 20-4, . . . , and 20-18, but the color patches 24a and 24b for Lab value acquisition may be printed as appropriate.

In this way, if the color patch 24 for Lab value acquisition and the color patch 22 for RGB value acquisition are separate things, and the color patch 24 for Lab value acquisition is placed on the same paper (or the same chart) as that of the color patch 22 for RGB value acquisition, it is possible to reduce the number of sheets required for the color measurement process for obtaining Lab value from 18 to two.

In other words, when the RGB value and the Lab value are acquired, by using the same color patch for the color patch for RGB value acquisition and the color patch for Lab value acquisition, it is necessary to read 18 sheets of color patches and color-measure the 18 sheets of color patches in order to acquire the RGB values, but in the present embodiment, it is sufficient to read 18 sheets of color patches and measure the colors of only two sheets of color patches in order to acquire the RGB values. Further, in the present embodiment, it is noted that even if the color patch 24 for Lab value acquisition and the color patch 22 for RGB value acquisition are separate things, the total number of sheets of paper (the number of sheets of patterns of a chart) is still 18.

Table 1 represents the number of patches, the number of sheets of a pattern of a chart, the printing area, the patch size of each of the color patch 22 for RGB value acquisition and the color patch 24 for Lab value acquisition according to the present embodiment.

TABLE 1

|  | Patch for RGB value acquisition | Patch for Lab value acquisition |
| --- | --- | --- |
| Number of patches | 1584 | 1584 |
| Number of sheets of pattern of chart | 18 sheets | 2 sheets |
| Printing area | ILS reading area | Other than ILS reading area |
| Patch size | Large (2 × 2 cm) | Small (0.7 × 0.7 cm) |

In Table 1, the ILS reading area of the printing area means the range of the reading by the color patch reading unit (in-line sensor: ILS) 103, and specifically represents the upper half of the paper in FIG. 2. In addition, whether the patch size is large or small is relative, and means that the patch size of a single color patch 24 for Lab value acquisition is relatively small, with the patch size of a single color patch 22 for RGB value acquisition as a reference.

Figure 3:
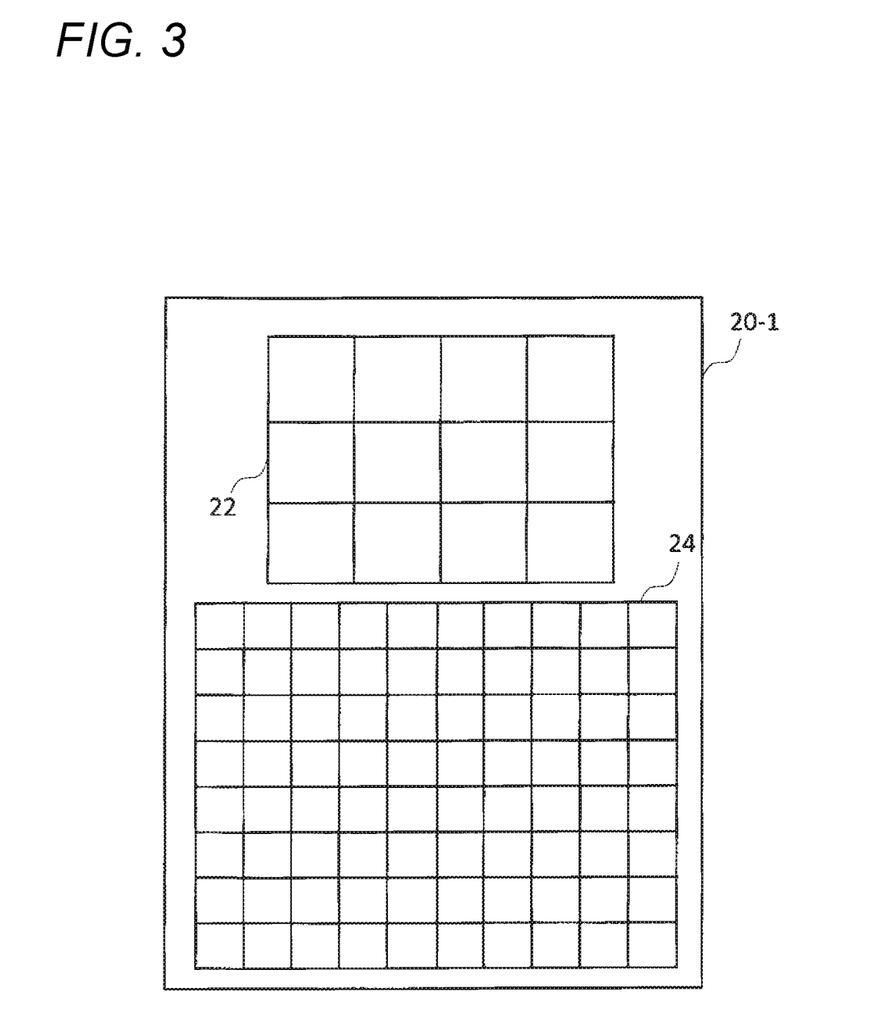
FIG. 3 is an explanatory diagram of a color patch according to another embodiment.

In addition, in the present embodiment, the color patch 24 for Lab value acquisition is divided into two color patches 24a and 24b for Lab value acquisition, a color patch 24a for Lab value acquisition is arranged on paper 20-1, and a color patch 24b for Lab value acquisition is arranged on paper 20-2, but if there is room in a margin portion due to the size of the paper and the size of the color patch 22 for RGB value acquisition, as illustrated in FIG. 3, the color patch 24 for Lab value acquisition may be arranged only on the paper 20-1. In this case, the number of sheets of a pattern of the color patch 24 for Lab value acquisition is further reduced to one.

Exemplary Embodiment 2

Hereinafter, Exemplary Embodiment 2 will be described with reference to the drawings. With respect to the same components as in Embodiment 1, the description thereof is omitted as appropriate here.

Basic Principle

The basic principle of the present embodiment is intended to arrange a plurality of evaluation color patches of the same color value in the color patch, evaluate an in-plane unevenness and an inter-job differences by using a color value difference obtained by reading the color value of the plurality of evaluation color patches, and prepare color conversion profile data by using the color patches of the paper with a color value difference being a tolerance or less. Even if printing and arranging a plurality of evaluation color patches having the same color value, if in-plane unevenness and an inter-job differences are present, variation occurs in the color value obtained by reading these evaluation color patches, and this causes a color value difference. In the present embodiment, the color value difference is used.

Here, the same color value means that a first color space value such as RGB and a second color space value such as Lab have the same color as each other. Therefore, a color value difference means a first color space value difference such as RGB, or a second color space value difference such as Lab. Further, the first color space is a color space that depends on an image forming apparatus (apparatus-dependent color space), and for example, RGB corresponds thereto. The second color space is a color space that does not depend on the image forming apparatus (apparatus-independent color space), and for example, Lab corresponds thereto. In the following embodiment, a description will be made, with the first color space as RGB and the second color space as Lab. Further, although the in-plane unevenness and the inter-job differences are evaluated as an RGB difference (ΔRGB) in the following embodiment, the RGB difference is not limited thereto. Further, "in-plane unevenness" means a change in the same color value in different positions in the same paper (chart), and "inter-job differences" means a change in the same color value in the same position of different sheets of paper (charts). Therefore, if a plurality of evaluation color patches are arranged in different positions of the same paper, it is possible to evaluate the in-plane unevenness in the paper; and if the plurality of evaluation color patches are arranged in the same position of different sheets of paper, it is possible to evaluate an inter-job differences, in other words, inter-job differences. The direction of the in-plane unevenness can roughly be a longitudinal direction, a lateral direction, and an oblique direction, and the evaluation color patches may be arranged in a longitudinal direction, a lateral direction, and an oblique direction.

For example, if color conversion profile data is generated by using a color patch having a color value difference being a tolerance or less even when the in-plane unevenness and the inter-job differences occur, it is possible to ensure the accuracy of the color conversion profile data.

A plurality of sheets of color patches for RGB value acquisition and color patches for Lab value acquisition are separately arranged as color patches. The color patch for RGB value acquisition and the color patch for Lab value acquisition may be the same in the number of patches, or may be different in the number of patches, for example, the size of the color patch for Lab value acquisition may be smaller than the size of the color patch for RGB value acquisition. When a plurality of sheets of color patches for RGB value acquisition are arranged, the plurality of sheets of the same number of color patches for Lab value acquisition are arranged. Although the plurality of sheets of arranged color patches for RGB value acquisition each has a different pattern, but the plurality of sheets of arranged color patches for Lab value acquisition may be overlapped with each other. In the following embodiment, 18 sheets of color patches for RGB value acquisition are arranged and 18 sheets of the same number of color patches for Lab value acquisition are arranged, but the number is not limited thereto.

Further, a plurality of evaluation color patches are arranged in the color patch for RGB value acquisition, and the in-plane unevenness and the inter-job differences are evaluated by using these evaluation color patches. If the in-plane unevenness and the inter-job differences, which are evaluated by using the evaluation color patches, are within tolerance, the RGB value and the Lab value are acquired by respectively using the color patch for RGB value acquisition and the color patch for Lab value acquisition, and a profile for color conversion is generated.

Meanwhile, if the in-plane unevenness and the inter-job differences, which are evaluated by using the evaluation color patches, exceed the tolerance, not only the RGB value but also the Lab value are acquired not by using the color patch for Lab value acquisition, but rather by using the color patch for RGB value acquisition, in the same manner as in the related art, and a profile for color conversion is generated.

Even if the in-plane unevenness and the inter-job differences, which are evaluated by using the evaluation color patches, exceed the tolerance, it is possible to generate the profile for color conversion by acquiring the RGB value and the Lab value by selectively using the combination of the color patch for RGB value acquisition and the color patch for Lab value acquisition, which can be within the tolerance.

Although the evaluation color patches for evaluating the in-plane unevenness are arranged in a longitudinal direction, a lateral direction, and an oblique direction in the following embodiment, without being limited thereto, the evaluation color patches can be arranged in any direction, such as only in the longitudinal direction, only in the lateral direction, only in the oblique direction, or only in the longitudinal direction and the lateral direction.

Further, although any one of the evaluation color patches for evaluating the in-plane unevenness is employed as the evaluation color patches for evaluating the inter-job differences in the following embodiment, without being limited thereto, respective different evaluation color patches may be used.

Although both the in-plane unevenness and the inter-job differences are evaluated in the following embodiment, the color conversion profile data may be generated by evaluating only the in-plane unevenness, or only the inter-job differences.

Next, the color patch of the present embodiment will be described.

Figure 4:
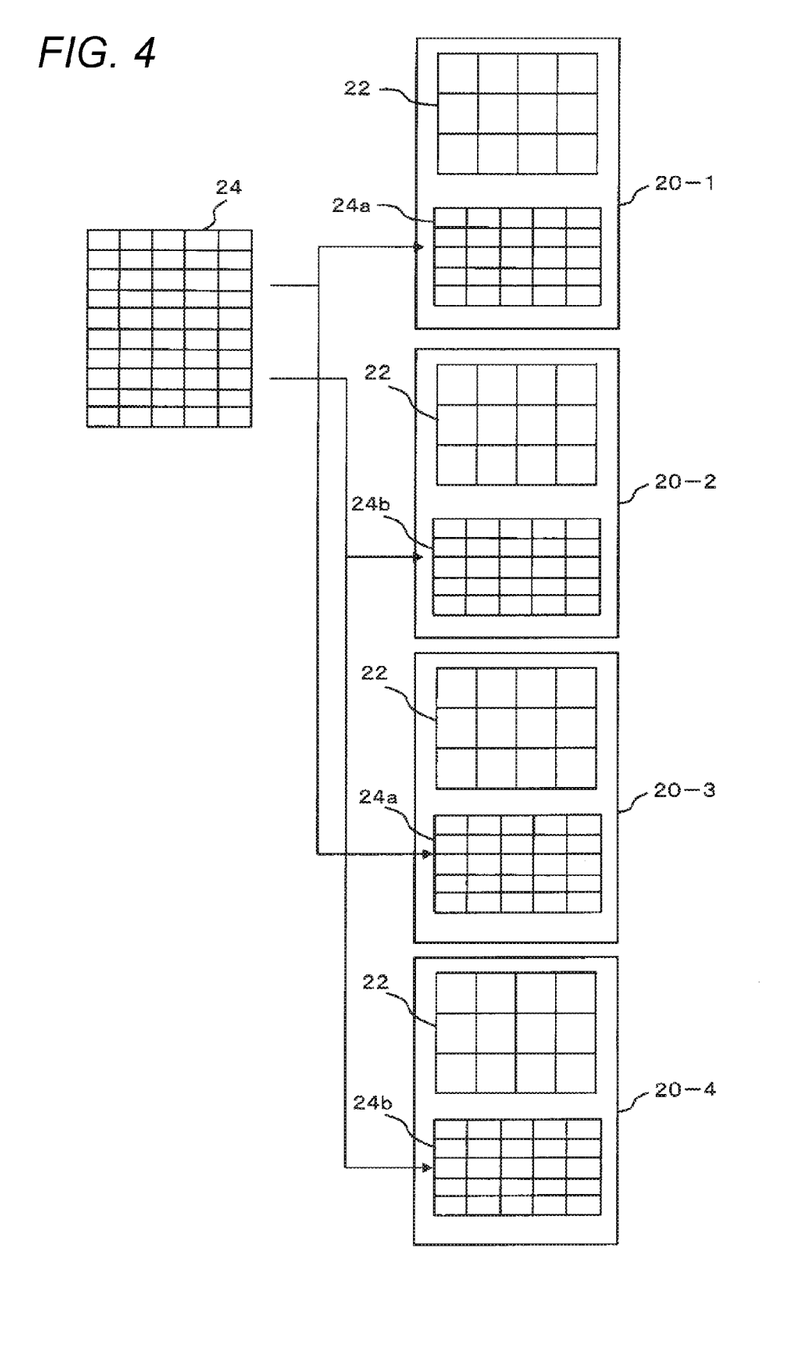
FIG. 4 is an explanatory diagram of a color patch according to the embodiment.

FIG. 4 schematically illustrates the color patch for RGB value acquisition and the color patch for Lab value acquisition of the present embodiment.

In addition, FIG. 4 illustrates only the sheets of paper 20-1, 20-2, 20-3, and 20-4 among sheets of paper (charts) having 18 sheets of color patches for RGB value acquisition printed thereon.

Of course, the pattern of the color patch 22 printed on the paper 20-1 and the patterns of the color patches 22 printed on the sheets of paper 20-2, 20-3, and . . . are different from each other.

Further, in the present embodiment, color patches 24a and 24b for Lab value acquisition are printed on other sheets of paper 20-3, 20-4, and 20-18.

Therefore, if a total of 18 sheets of paper (charts) are assumed as 20-i (i=1, 2, 3, . . . , and 18), when i is an odd number such as 1, 3, 5, . . . , the color patch 22 for RGB value acquisition and the color patch 24a for Lab value acquisition are arranged; and when i is an even number such as 2, 4, 6, . . . , the color patch 22 for RGB value acquisition and the color patch 24b for Lab value acquisition are arranged.

Evaluation Color Patches

Figure 5:
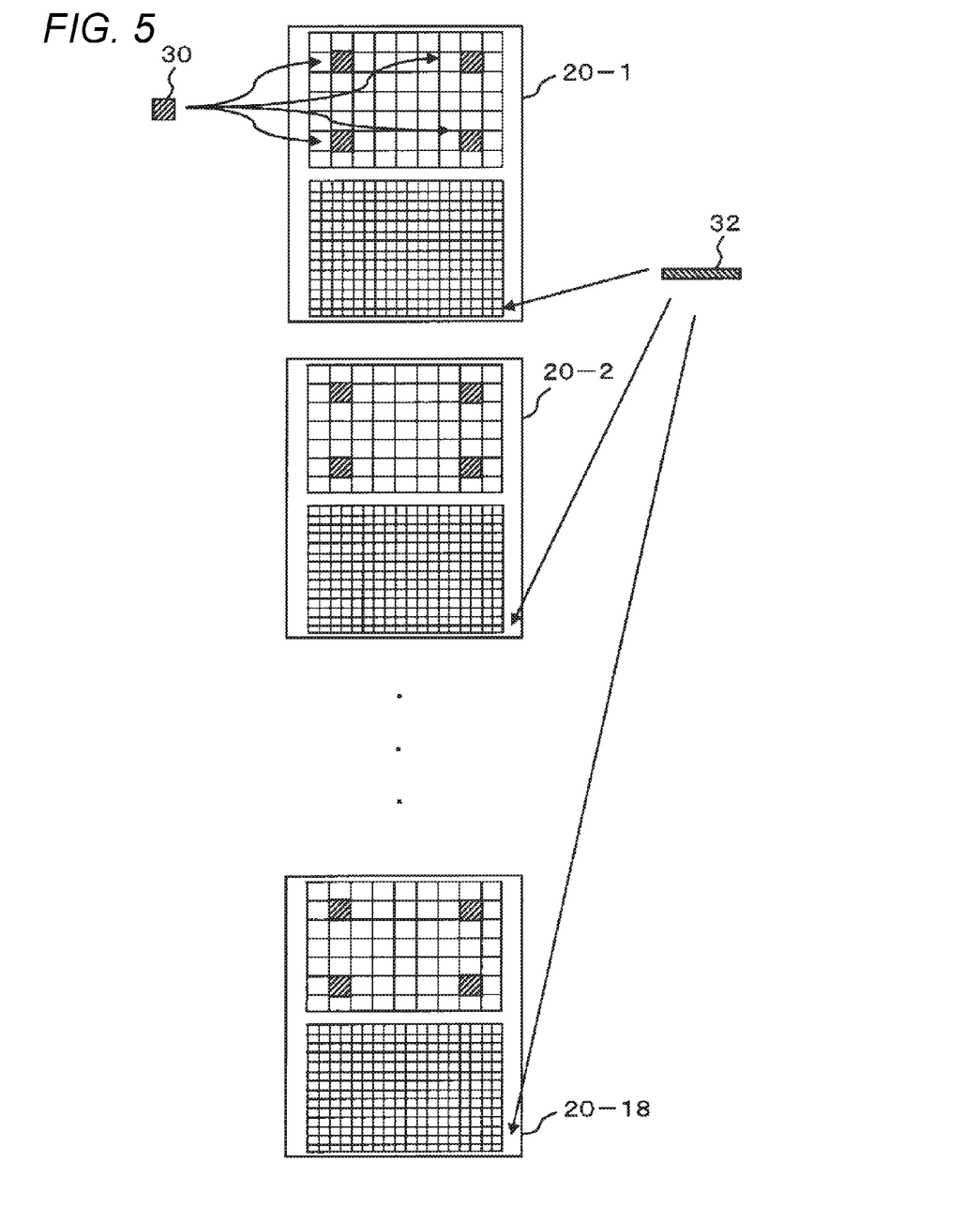
FIG. 5 is an explanatory diagram of an arrangement of evaluation color patches and identification patches.

FIG. 5 illustrates the evaluation color patches.

The evaluation color patches 30 are embedded in the four locations of the color patch 22 for RGB value acquisition. If taking the paper 20-1 as an example, the evaluation color patches 30 are arranged in the respective corners of a rectangle among the color patches 22 for RGB value acquisition, and two color patches are arranged and spaced apart in the longitudinal direction, the lateral direction, and the oblique direction. The evaluation color patches 30 which are arranged in four positions all have the same color value. Although the arrangement position is not particularly limited, it is preferable that to the extent consistent with the purpose of evaluation of the in-plane unevenness, the evaluation color patches 30 are spaced apart in the longitudinal direction, the lateral direction, and the oblique direction.

In addition, the same applies to other sheets of paper 20-2, 20-3, . . . ; and 20-18, and the evaluation color patches 30 are arranged in a predetermined position of the color patch 22 for RGB value acquisition, that is, in the same position as the arrangement position in the paper 20-1.

In addition, in the present embodiment, separately from the evaluation color patches 30, identification patches 32 for identifying respective sheets of paper 20-1, 20-2, . . . , and 20-18 are arranged. The identification patch 32 is intended to identify each sheet of paper, and so to speak, corresponds to the page number of the paper, such that the identification patch 32 does not need to be a color patch. The identification patch 32 may be arranged in positions different from those of the color patch 22 for RGB value acquisition and the color patches 24a and 24b for Lab value acquisition, and as illustrated in FIG. 5, may be arranged in the color patches 24a and 24b for Lab value acquisition.

In-Plane Unevenness Evaluation

Figure 6:
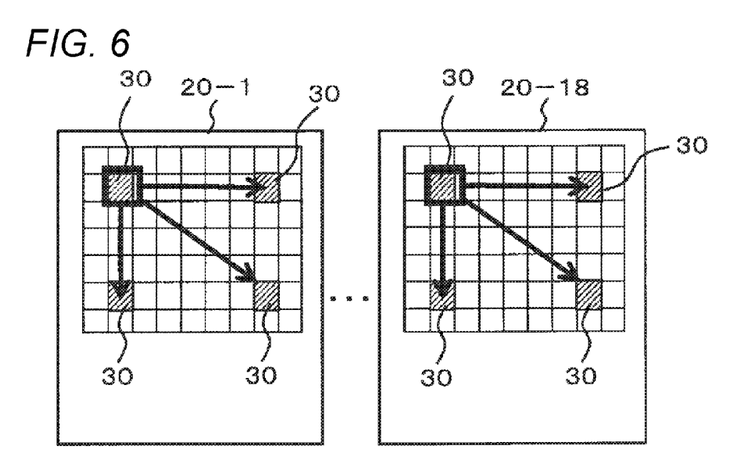
FIG. 6 is an explanatory diagram of evaluation of in-plane unevenness.

FIG. 6 illustrates an evaluation method of an in-plane unevenness.

In the paper 20-1, the in-plane unevenness, specifically, the in-plane unevenness in the longitudinal direction, the in-plane unevenness in the lateral direction, and the in-plane unevenness in the oblique direction are evaluated by using four evaluation color patches. With one of the four evaluation color patches 30, for example, the evaluation color patch 30 arranged in the upper left, as a reference, the in-plane unevenness in the longitudinal direction is evaluated by using the reference patch and the color patch disposed in the longitudinal direction relative to the reference patch, the in-plane unevenness in the lateral direction is evaluated by using the reference patch and the color patch disposed in the lateral direction relative to the reference patch, and the in-plane unevenness in the oblique direction is evaluated by using the reference patch and the color patch disposed in the oblique direction relative to the reference patch. The in-plane unevenness in the longitudinal direction, the lateral direction, and the oblique direction are evaluated by performing the above evaluation on the other all sheets of paper 20-2, 20-3, . . . , and 20-18.

Figure 7A:
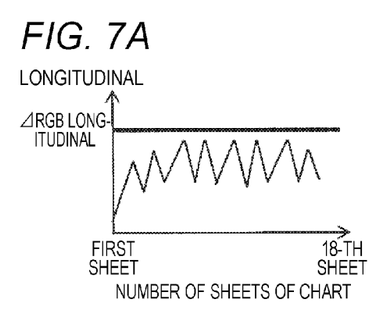
FIGS. 7A to 7C are graphs illustrating changes in the in-plane unevenness in a longitudinal direction, a lateral direction, and an oblique direction.
Figure 7B:
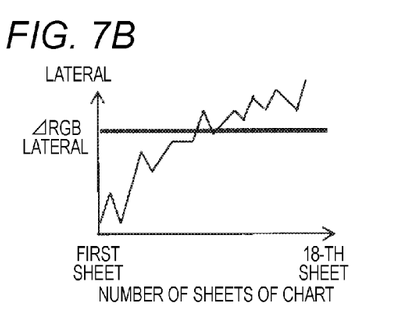
Figure 7C:
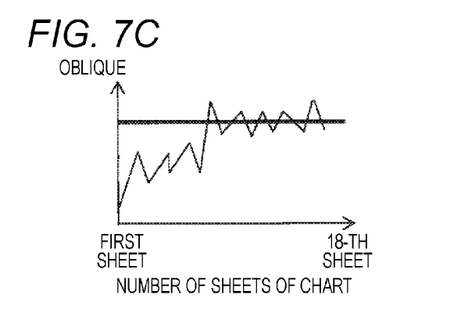

FIGS. 7A to 7C illustrate examples of the in-plane unevenness. FIG. 7A illustrates the in-plane unevenness in the longitudinal direction, and the horizontal axis represents the number of sheets of paper (charts), in which paper 20-1 corresponds to a first sheet, and paper 20-18 corresponds to a 18th sheet. The vertical axis represents a difference ΔRGB between the RGB values of two evaluation color patches 30 which are arranged in the longitudinal direction. Since the RGB values are originally the same color value, ΔRGB value is 0; and if the in-plane unevenness is present, the ΔRGB value becomes a finite value other than 0.

FIG. 7B illustrates the in-plane unevenness in the lateral direction, the horizontal axis represents the number of sheets of paper (charts), and the vertical axis represents a difference ΔRGB between the RGB values of two evaluation color patches 30 which are arranged in the lateral direction. Since the RGB values are originally the same color value, ΔRGB value is 0; and if the in-plane unevenness is present, the ΔRGB value becomes a finite value other than 0.

FIG. 7C illustrates the in-plane unevenness in the oblique direction, the horizontal axis represents the number of sheets of paper (charts), and the vertical axis represents a difference ΔRGB between the RGB values of two evaluation color patches 30 which are arranged in the oblique direction. Since the RGB values are originally the same color value, ΔRGB value is 0; and if the in-plane unevenness is present, the ΔRGB value becomes a finite value other than 0.

If the ΔRGB values in the longitudinal direction, the lateral direction and the oblique direction are within a tolerance, that is, a tolerance in the case of measurement by the colorimeter 107, the in-plane unevenness, even if it is present, can be ignored. However, if the ΔRGB values exceed the tolerance, the in-plane unevenness cannot be ignored, and even if the color patches 24a and 24b for Lab value acquisition are arranged separately from the color patch 22 for RGB value acquisition, it affects the accuracy of color conversion profile.

In the case of FIGS. 7A to 7C, since the in-plane unevenness in the longitudinal direction is a tolerance or less in all the sheets of paper (charts), there is no problem; but since the in-plane unevenness in the lateral direction and the oblique direction exceeds the tolerance, the in-plane unevenness can be problematic. One of countermeasures for such a case is the colorimeter 107 measuring color not by using the color patches 24a and 24b for Lab value acquisition, but rather by using color patch 22 for RGB value acquisition.

Inter-Job Difference Evaluation

Figure 8:
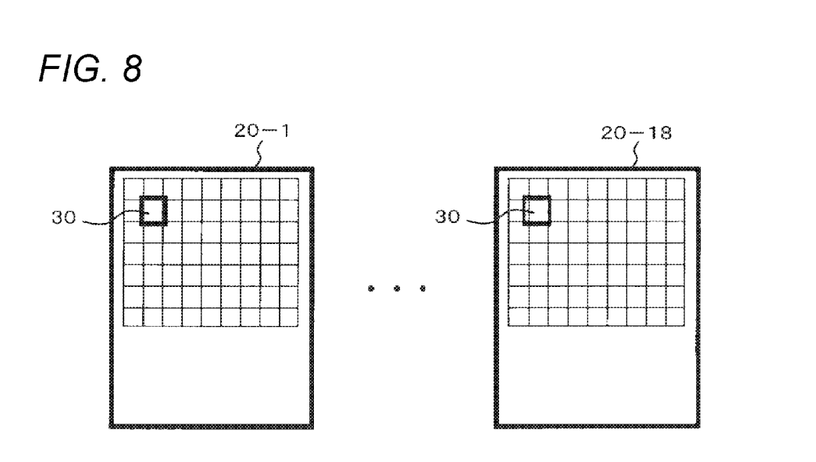
FIG. 8 is an explanatory diagram of evaluation of inter-job differences.

FIG. 8 illustrates an evaluation method of an inter-job differences.

If one of the four evaluation color patches 30 which are arranged in each of the sheets of paper 20-1, 20-2, . . . , and 20-18, that is, the color patch arranged in the upper left is set as a reference patch, and the ΔRGB value between 18 reference patches is evaluated in a round-robin manner.

Specifically, ΔRGB values are a ΔRGB value between the reference patch of the paper 20-1 and the reference patch of the paper 20-2, a ΔRGB value between the reference patch of the paper 20-1 and the reference patch of the paper 20-3, . . . , a ΔRGB value between the reference patch of the paper 20-1 and the reference patch of the paper 20-18, a ΔRGB value between the reference patch of the paper 20-2 and the reference patch of the paper 20-3, a ΔRGB value between the reference patch of the paper 20-17 and the reference patch of the paper 20-18.

Figure 9:
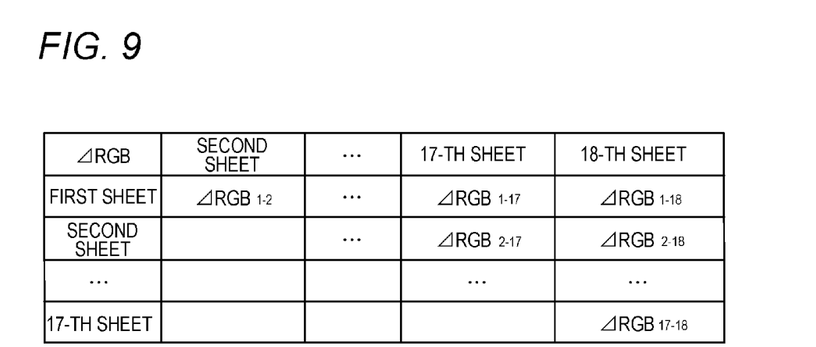
FIG. 9 is a table illustrating the inter-job differences which are calculated in a round-robin manner.

FIG. 9 illustrates a table of ΔRGB values which are evaluated in a round-robin manner, that is, for all available combinations. In FIG. 9, the ΔRGB value of the reference patch of the paper 20-1 (first sheet) and the paper 20-2 (second sheet) is represented by $\Delta RGB_{1-2}$. A combination of two sheets of paper having the minimum ΔRGB value is extracted, among ΔRGB values which are evaluated in a round-robin manner. However, with respect to the color patches for Lab value acquisition of the extracted combination of two sheets, it is required that one is a color patch 24a for Lab value acquisition, and the other is a color patch 24b for Lab value acquisition. The reason is that, if both color patches for Lab value acquisition of the extracted combination of two sheets are the color patch 24a for Lab value acquisition, it is not possible to acquire the Lab value sufficient for color measurement. Therefore, if the ΔRGB values which are evaluated in a round-robin manner are represented by $\Delta RGB_{i-j}$, the minimum ΔRGB value is extracted among combinations of which one of i and j is an odd number and the other is an even number, i and j corresponds to a page number, and can be specified by the identification patch 32.

For example, in the case of $\Delta RGB_{1-3} < \Delta RGB_{2-4} < \Delta RGB_{1-2} < \Delta RGB_{1-3}$ and $\Delta RGB_{2-4}$ are not selected, and $\Delta RGB_{1-2}$ is selected, and color is measured by the colorimeter 107 using the color patches 24a and 24b for Lab value acquisition of the paper 20-1 and the paper 20-2.

In addition, such a process is based on a fact that the color patch 24 for Lab value acquisition is divided into the color patches 24a and 24b for Lab value acquisition and printed on different sheets of paper. When the color patch 24 for Lab value acquisition is printed on a single sheet of paper, this process is not need, and only the smallest ΔRGB value may be extracted. Even if the color patch 24 for Lab value acquisition is divided into the color patches 24a and 24b for Lab value acquisition and printed on different sheets, when calculating the ΔRGB value in a round-robin manner, if limited to all possible combinations including the color patches 24a and 24b for Lab value acquisition, only smallest ΔRGB value may be extracted.

Since both the in-plane unevenness and the inter-job differences affect the color measurement by the colorimeter 107, it is preferable that the in-plane unevenness is within a tolerance, and the inter-job differences are also within a tolerance. Therefore, if the in-plane unevenness is also within the tolerance, with respect to a combination of two sheets having the smallest inter-job differences, it is preferable to finally employ the combination of two sheets.

However, in a case having a reason of disregarding any one of the in-plane unevenness and the inter-job differences, it is sufficient to evaluate either the in-plane unevenness or the inter-job differences.

Overall Process

Next, the overall process of the present embodiment will be described. This is the case where both the in-plane unevenness and the inter-job differences are to be required within a tolerance.

Figure 10:
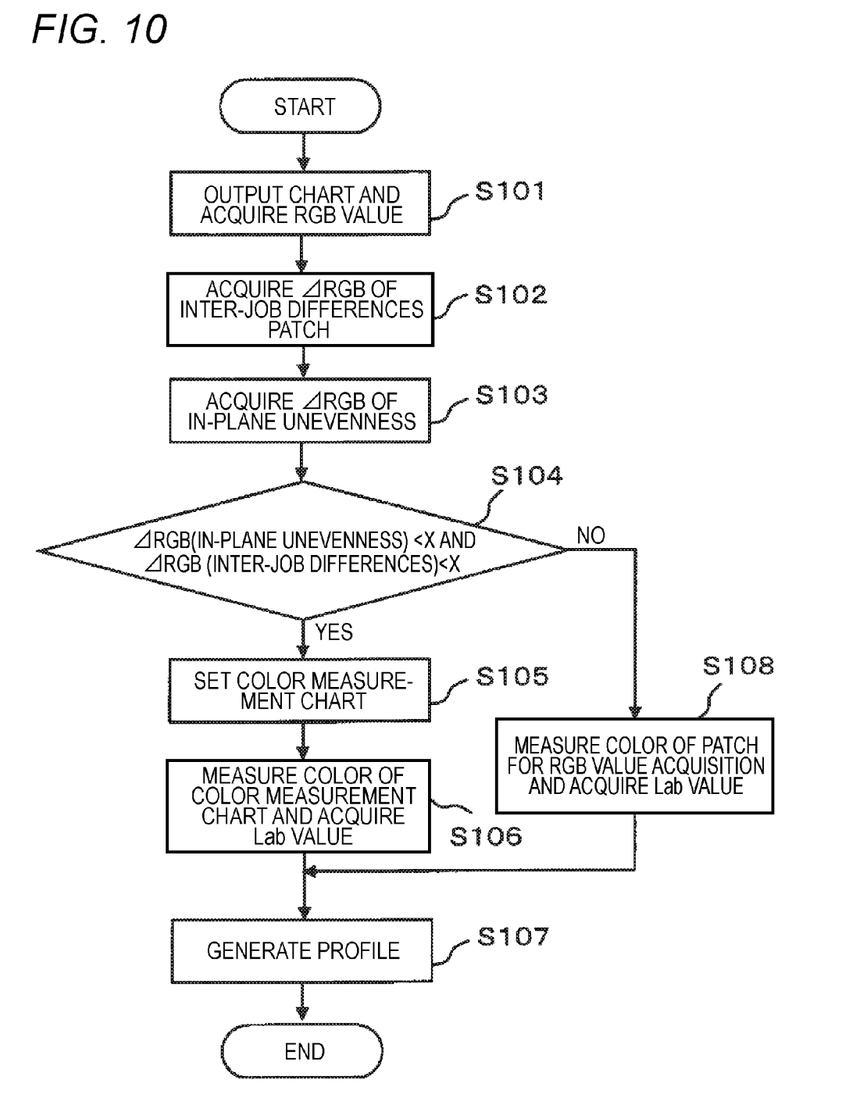
FIG. 10 is a process flow chart of the embodiment.

FIG. 10 is a process flow chart of the embodiment. First, the control unit 105 controls the print engine 102 so as to output a total of 18 sheets, in other words, charts. Then, at this time, the color patch reading unit (in-line sensor) 103 reads the color patch 22 for RGB value acquisition and obtains an RGB value (S101).

Next, the control unit 105 calculates the ΔRGB value indicating the inter-job differences by using the obtained RGB value and calculates the ΔRGB value indicating the in-plane unevenness (S102, S103). For the inter-job differences, $\Delta RGB_{i\text{-}j}$ is calculated in a round-robin manner, by using a reference patch. For the in-plane unevenness ΔRGBs in the longitudinal direction, the lateral direction, and the oblique direction are calculated by using the reference patch.

Next, the control unit 105 determines whether or not the ΔRGB indicating the calculated in-plane unevenness and the ΔRGB indicating the inter-job differences are smaller than a threshold X (S104). The determination is intended to determine whether or not both the in-plane unevenness and the inter-job differences are the tolerance or less. A setting method of the threshold X will be described later. The inter-job differences is to be determined for a combination having the smallest ΔRGB value, among the combination in which one of i and j is an odd number and the other is an even number.

When both the in-plane unevenness and the inter-job differences are smaller than the threshold X, the sheets of paper 20-i and 20-j, which are specified by determination targets i and j, are set as the color measurement chart (S105). In this case, the control unit 105 specifies the paper 20-i and the paper 20-j, by using the identification patch 32.

Next, the control unit 105 measures the colors of the color patch for Lab value acquisition of the paper 20-i and the color patch for Lab value acquisition of the paper 20-j, which are set color measurement charts, by using the colorimeter 107, and obtains the Lab values (S106).

Next, the control unit 105 generates profile data, by using the RGB value acquired in S101 and the Lab value acquired in S106 (S107). This step includes a first step of performing brightness conversion based on a look-up table (LUT), on the color conversion profile, and a second step of performing linear conversion by matrix calculation (for example, matrix calculation of 3×10), and the coefficients of the matrix equation is calculated by using an arithmetic algorithm from data pair of the RGB value and the Lab value. The LUT and the coefficients of the matrix equation are stored in the storage unit 104 as parameters.

Meanwhile, when at least one of the in-plane unevenness and the inter-job differences is the threshold X or more (NO in S104), profile data is generated, not by using the color patches 24a and 24b for Lab value acquisition, but rather by using a Lab value obtained by color-measurement of the color patch 22 for RGB value acquisition by the colorimeter 107 (S108, S107).

Here, the threshold X used in the determination process of S104 is determined in consideration of the factors of a color difference. In other words, as the factors of a color difference.

Profile accuracy

Image forming apparatus (IOT) variation

Color patch reading unit (ILS) variation are considered, such that an average color difference $\Delta E_{ave}$ becomes $\Delta E_{ave} = \{(\text{profile accuracy})^2 + (\text{IOT variation})^2 + (\text{ILS variation})^2\}^{0.5}$.

For example, if

Profile accuracy=1.5

Image forming apparatus (IOT) variation=2.0

Reading variation of color patch reading unit (ILS)=x, and the threshold of $\Delta E_{ave}$ is 3.0, $\Delta E_{ave} = \{(1.5)^2 + (2.0)^2 + x^2\} < 3.0$, such that x<1.66.

In this case, the thresholds X of the in-plane unevenness and the inter-job differences are 1.66.

In the present embodiment, in the case of YES in S104, in other words, when both the in-plane unevenness and the inter-job differences are smaller than the threshold X, color conversion profile data is generated by color-measurement using two sheets of paper which are set as the color measurement chart, for example, the paper 20-1 and the paper 20-2, such that the number of color measurement steps is greatly reduced. In other word, when the RGB value acquisition and the Lab value acquisition are performed not by using the color patch 24 for Lab value acquisition, but by using only the color patch 22 for RGB acquisition, 18 sheets are required for the RGB acquisition, and 18 sheets are required for the Lab value acquisition, but in the present embodiment, 18 sheets are required for the RGB acquisition, and two sheets are required for the Lab value acquisition, such that the number of color measurement steps is greatly reduced from 18 to two. However, since it is ensured that the in-plane unevenness and the inter-job differences of the two sheets selected in the present embodiment are within a tolerance, it is possible to ensure the accuracy of the color conversion profile data.

Figure 11:
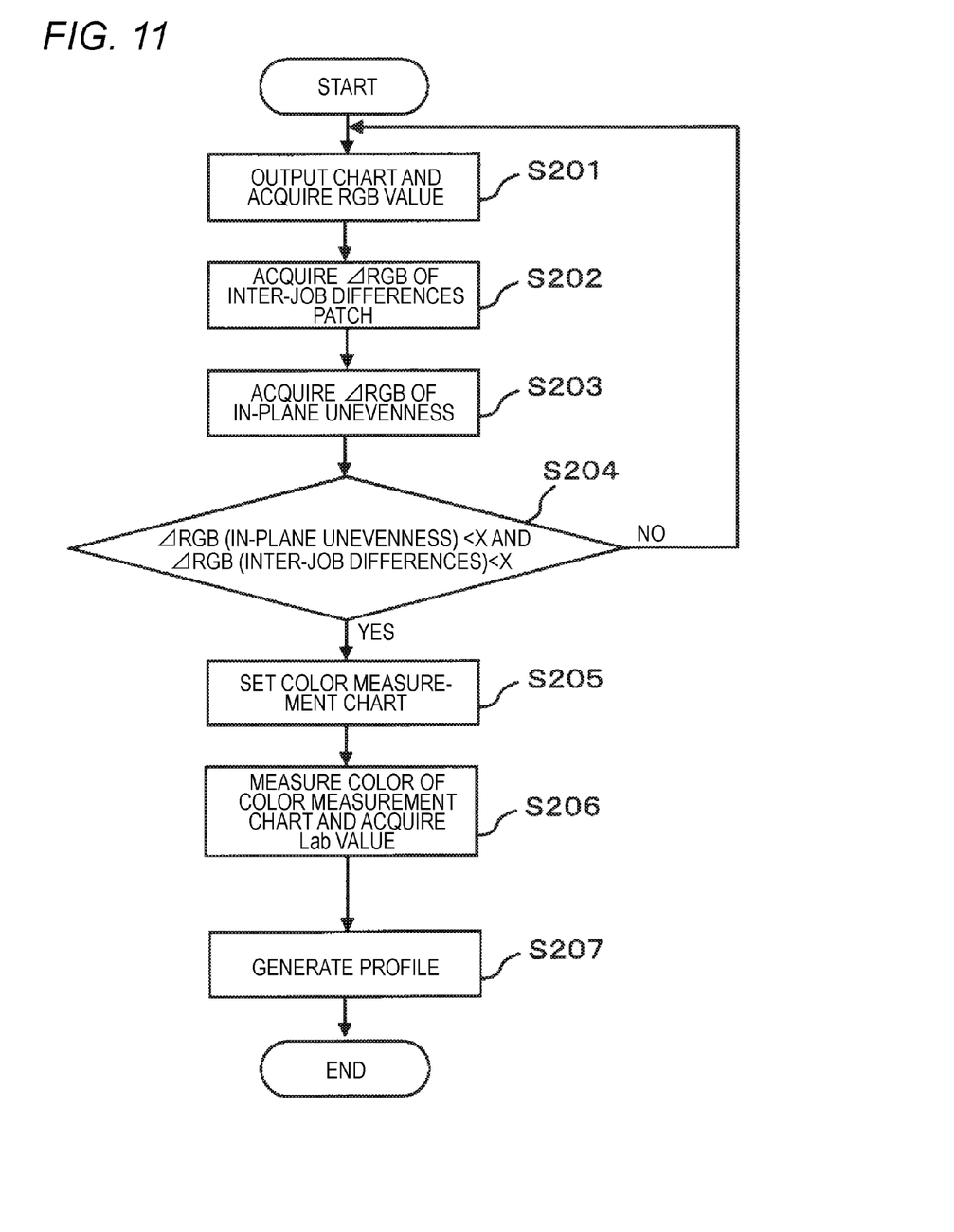
FIG. 11 is a process flow chart of another embodiment.

FIG. 11 is an overall process flow chart in another embodiment. FIG. 11 relates to a process when at least one of in-plane unevenness and inter-job differences is a threshold or more, differently from FIG. 10.

In S201 to S204 which are the same as S101 to S104 in FIG. 10, an RGB value is acquired, a ΔRGB indicating the in-plane unevenness and the inter-job differences is calculated, and the ΔRGB is compared with a value X. If the in-plane unevenness and the inter-job differences are smaller than the value X, a color-measurement chart is set, a color patch for Lab value acquisition is color-measured, and profile data is generated, similar to FIG. 10 (S205 to S207).

Meanwhile, if at least one of the in-plane unevenness and the inter-job differences is the threshold X or more in S204 (NO in S204), the process returns to S201, the chart is output, the RGB value is re-acquired, and the in-plane unevenness and the inter-job differences are calculated. Then, the in-plane unevenness and the inter-job differences are re-compared with the threshold, if they are smaller than the threshold X, the process subsequent to S205 is performed; otherwise, the process returns again to the process of S201. In other words, a chart is repeatedly output until the in-plane unevenness and the inter-job differences are smaller than the threshold X. Of course, since repeating the process indefinitely is useless, it is preferable that the upper limit of the chart to be output is set and the process is repeated until the number of executions reaches the upper limit; even if the number of executions reaches the upper limit, the in-plane unevenness and the inter-job are the threshold or more, similar to FIG. 10, the Lab value is acquired by using the color patch 22 for RGB value acquisition and profile data is generated.

Hitherto, the embodiments of the present invention have been described, but the image forming apparatus 10 according to the embodiment can be applied to a system which is connected to a color management server over a network, measures the color by outputting a color patch by the image forming apparatus 10, transmits colorimetric data to a color management server, and regularly and remotely manages the state of the image forming apparatus 10 on the color management server side.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
  a printing unit that arranges a plurality of evaluation color patches of the same color value in a color patch, and prints the evaluation color patches on paper; and
  a control unit that reads respective color values of the printed evaluation color patches, and generates color conversion profile data by using a color patch of paper having a color value difference being equal to or less than a tolerance,
  wherein when the color value difference is greater than the tolerance, the printing unit repeatedly prints the color patch on paper, until the color value difference is equal to or less than the tolerance.

2. The image forming apparatus according to claim 1, wherein the printing unit arranges the evaluation color patches in different positions of the same paper, and prints the evaluation color patches.

3. The image forming apparatus according claim 2, wherein the printing unit arranges the evaluation color patches in any one of a longitudinal direction, a lateral direction and an oblique direction of the same paper, as different positions, and prints the evaluation color patches.

4. The image forming apparatus according to claim 1, wherein the printing unit arranges the evaluation color patches in the same positions of different sheets of paper, and prints the evaluation color patches.

5. The image forming apparatus according to claim 4, wherein the control unit generates color conversion profile data by using a color patch of paper having a minimum color value difference being within the tolerance, among color value differences for all available combinations of the evaluation color patches which are arranged in the same positions of different sheets of paper.

6. The image forming apparatus according to claim 1, wherein the printing unit arranges the evaluation color patches in different positions of the same paper and in the same positions of different sheets of paper, and prints the evaluation color patches.

7. The image forming apparatus according to claim 1, wherein the printing unit prints a color patch for first color space value acquisition and a color patch for second color space value acquisition as the color patch, and
  the control unit generates the color conversion profile data, from a first color space value obtained by reading the color patch for first color space value acquisition and a second color space value obtained by color measurement of the color patch for second color space value acquisition.

8. The image forming apparatus according to claim 7, wherein the printing unit prints the color patch for first color space value acquisition and the color patch for second color space value acquisition on the same paper for a plurality of sheets of paper.

9. The image forming apparatus according to claim 8, wherein the evaluation color patches are arranged in the color patch for first color space value acquisition.

10. The image forming apparatus according to claim 8, wherein the printing unit prints an identification patch for identifying each of the plurality of sheets of paper.

11. The image forming apparatus according to claim 7, wherein the first color space is an apparatus-dependent color space, and
  the second color space is an apparatus-independent color space.

12. The image forming apparatus according to claim 11, wherein the first color space is RGB, and
  the second color space is Lab.

13. A non-transitory computer readable medium storing a program causing a computer to execute a process for an image forming apparatus, the process comprising:
  arranging a plurality of evaluation color patches of the same color value in a color patch, and printing the evaluation color patches on paper; and
  reading respective color values of the printed evaluation color patches, and generating color conversion profile data by using a color patch of paper having a color value difference being equal to or less than a tolerance,
  wherein when the color value difference is greater than the tolerance, the printing unit repeatedly prints the color patch on paper, until the color value difference is equal to or less than the tolerance.

* * * * *